United States Patent

Zefira

[11] Patent Number: 6,137,065
[45] Date of Patent: Oct. 24, 2000

[54] LEVEL WEIGHING DEVICE

[76] Inventor: Uri Zefira, P.O. Box 241, 15241 Kfar Tavor, Israel

[21] Appl. No.: 09/142,855
[22] PCT Filed: Apr. 6, 1994
[86] PCT No.: PCT/US94/03741
    § 371 Date: Jun. 3, 1998
    § 102(e) Date: Jun. 3, 1998
[87] PCT Pub. No.: WO94/25834
    PCT Pub. Date: Nov. 10, 1994

[30] Foreign Application Priority Data

Apr. 23, 1993 [IL] Israel ............................ 105508

[51] Int. Cl.[7] ............................ G01G 19/22; G01G 3/14; G01C 15/10
[52] U.S. Cl. .................... 177/25.13; 33/366.11; 33/366.26; 177/210 R
[58] Field of Search ................. 177/25.13, 133, 177/136, 210 R, 211, 229; 33/365, 366.11, 366.12, 366.13, 366.14, 366.15, 366.16, 366.17, 366.18, 366.19, 366.2, 366.21, 366.22, 366.23, 366.24, 366.25, 366.26, 366.27

[56] References Cited

U.S. PATENT DOCUMENTS

| 4,494,620 | 1/1985 | Knothe et al. | 177/25.13 |
| 4,907,179 | 3/1990 | Oldendorf et al. | 177/25.13 |
| 5,428,219 | 6/1995 | Cwalinski | 33/366.11 |
| 5,646,376 | 7/1997 | Kroll et al. | 177/136 |
| 5,992,032 | 11/1999 | Chiang et al. | 33/366.11 |

FOREIGN PATENT DOCUMENTS

| 2497995 | 7/1982 | France | 177/25.13 |

Primary Examiner—Randy W. Gibson
Attorney, Agent, or Firm—Mark M. Friedman

[57] ABSTRACT

A weighing device (2) for accurately weighing an object, which includes a support base (4), a weighing platform (8) for supporting the object and a load cell (6) mounted on the base (4) for measuring the weight of the object. The load cell (6) includes an anchoring section (18) for anchoring the load cell (6) to the support base (4). The device further includes an inclinometer (28) horizontally positioned in correspondence with the anchoring section (18) of the load cell (6) for measuring the levelness of the load cell (6). A display means (32) is connected to the inclinometer (28) for conveying information necessary to obtain an accurate weight measurement.

7 Claims, 3 Drawing Sheets

LEVEL WEIGHING DEVICE

FIELD AND BACKGROUND OF THE INVENTION

The present invention is related to a weighing device, and particularly to a weighing device which includes an inclinometer. The invention is also related to a method for accurately weighing an object.

It is well known that in order for a weighing scale to accurately measure the weight of an object, it must be level. By the term 'level' it is meant parallel with the plane of the horizon, or in other words, perfectly horizontal. The scale must be level because the load cell, which measures the load, only measures directly vertical forces applied to it. If the force applied to the load cell is at an angle, only the vertical component of the force (the force x the cosine of the angle) will be measured.

In order to ensure the levelness of a scale, it is customary to include on the surface of the scale a small liquid-filled transparent chamber or vial containing a bubble. A circle or other mark is located on the surface of the chamber so that when the scale is level, the bubble is positioned within the mark. The levelness of the scale can be adjusted, for example, by adjusting the lengths of the legs of the scale. Although this method results in a level scale, it is quite time-consuming and involves much trial-and-error until the legs of the scale are adjusted to their proper lengths.

Tilt sensors or inclinometers are instruments, usually electrical or electronic, capable of measuring quantitatively the angle of tilt of an object and outputting the result to an appropriate display. Various types of these instruments based on various physical principles such as electrical resistance of a liquid or the displacement of a pendulum are known. They are commonly installed in ships or aircraft, or used with construction lasers or vertical gyros.

It is an object of the invention to provide a weighing device which can be levelled quickly and easily.

It is another object of the invention to provide a weighing device will give an accurate weight measurement without being levelled.

It is a further object of the invention to provide a new type of inclinometer.

SUMMARY OF THE INVENTION

In accordance with this invention there is thus provided a weighing device for accurately weighing an object comprising: a support base; a weighing platform for supporting the object; a load cell mounted on the base for measuring the weight of the object, the load cell comprising an anchoring section for anchoring the load cell to the support base; an inclinometer horizontally positioned in correspondence with the anchoring section of the load cell for measuring the levelness of the load cell; and a display means connected to the inclinometer for conveying information necessary to obtain an accurate weight measurement.

In accordance with this invention there is also provided a method for accurately weighing an object using the above weighing device.

By combining an inclinometer with a weighing scale, the levelling of the scale is greatly simplified and speeded up. In addition, it is possible to integrate the output of the load cell and the inclinometer in a processor so that the weight measurement is automatically corrected for the tilt of the scale, in which case the need to adjust the level of the scale is obviated.

In addition to the aforementioned types of inclinometers, a load cell can be used in a similar manner to measure the tilt of an object. The load cell can be calibrated to measure an internal weight (or its own weight) while in a horizontal state. If the load cell is then tilted, it will measure a weight less than the calibrated weight by a factor related to the cosine of the angle of tilt. This output can then be used to indicate the degree of tilt.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
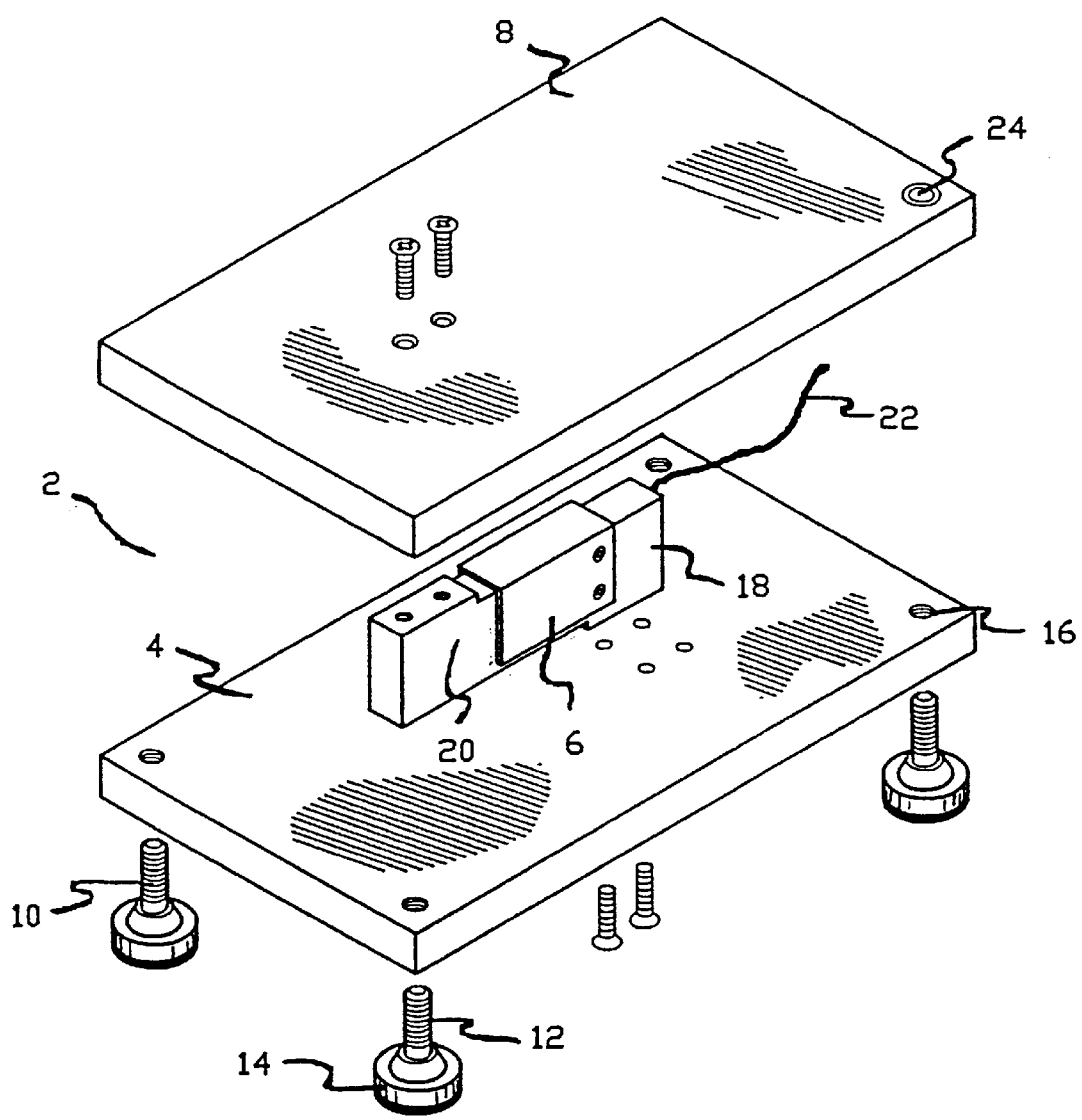
FIG. 1 is a schematic, exploded, perspective view of a prior art weighing scale.

Referring now to FIG. 1, there is illustrated a weighing device, generally designated 2, comprising a support base 4, a load cell 6 mounted on the base, and a weighing platform 8 supported by the load cell.

The base 4 is supported on four rotatable legs 10, each comprising a threaded rod 12 and a base element 14. The legs are threaded respectively into four threaded holes 16 located at the corners of the base 4. The heights of the corners of the base, and therefore its levelness, are adjusted by the extent of the threading of the rods 12 into the holes 16.

The load cell 6 includes two sections, an anchoring section 18 which anchors the load cell to the base, and a load-bearing section 20 which is attached to the weighing platform 8 for measuring the weight of the object on the platform. The upper surface of the load bearing section 20 projects slightly above the remainder of the load cell and its lower surface does not rest on the base, so that it is free to bear the weight of the object. An electrical cord 22 transmits the weight measurement to a display means (not shown).

The weighing platform 8 rests on the load-bearing section 20 of the load cell and is attached to it. The platform includes a levelling chamber 24 for indicating the horizontal position of the platform.

Figure 2:
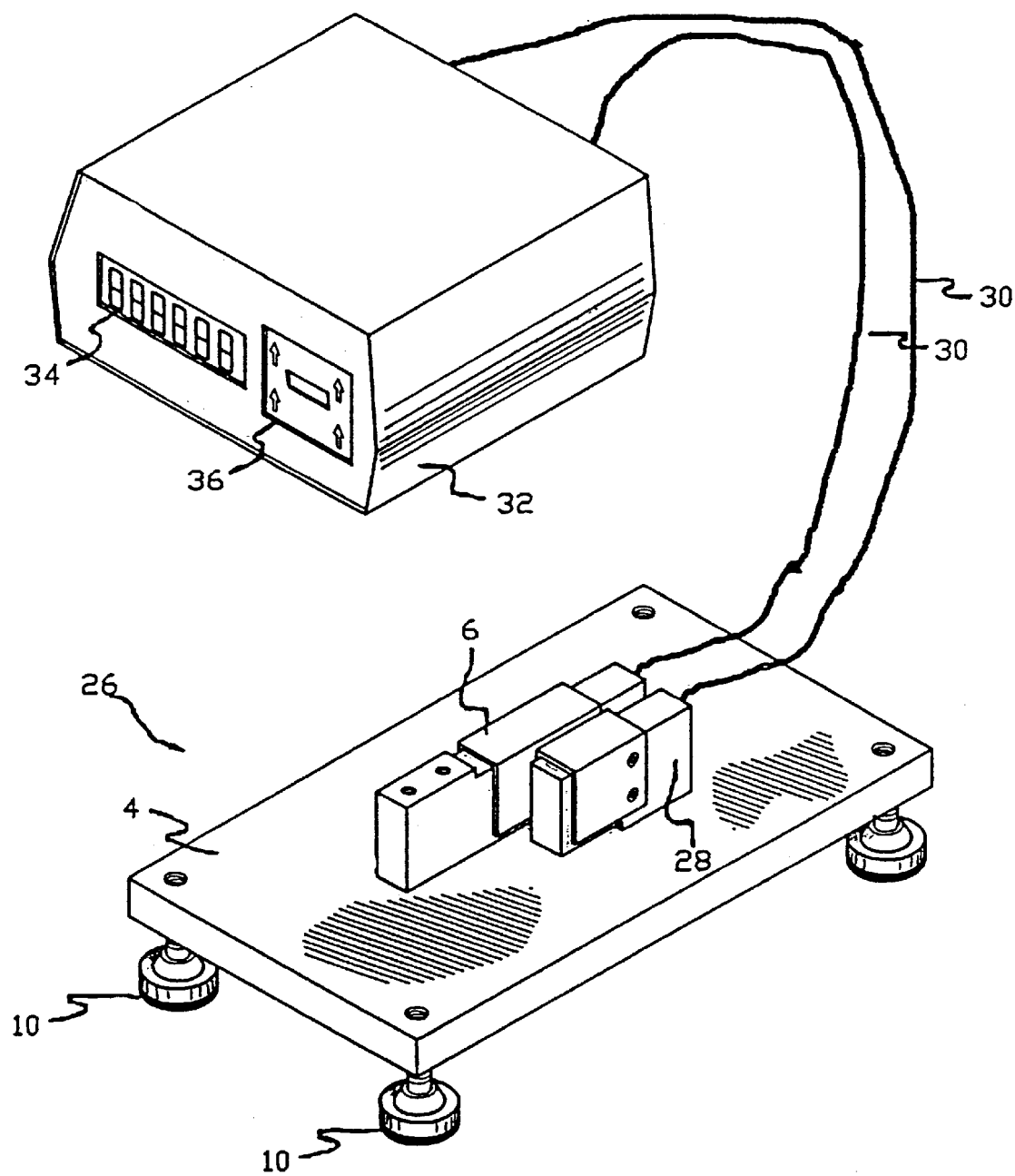
FIG. 2 is a schematic, perspective view of one embodiment of the invention.

FIG. 2 illustrates a weighing device 26 without the weighing platform. Mounted on the base 4, in addition to the load cell 6, is an inclinometer 28, in this case, another load cell calibrated as explained above. Both the load cell and the inclinometer are fixed to the support base 4 so that their horizontal positions are in correspondence one to the other. It is to be understood that the same result is obtained by securing the inclinometer to the load cell rather than to the base.

Wires 30 extend from the load cell and inclinometer to a display means 32 which has a first display 34 for displaying the weight measured by the scale and a second display 36 for indicating which legs 10 of the base should be threaded in which direction in order to bring the scale to levelness. The first display 34 is connected to the load cell 6 and the second display 36 is connected through a processor in the display means to the inclinometer 28.

Figure 3:
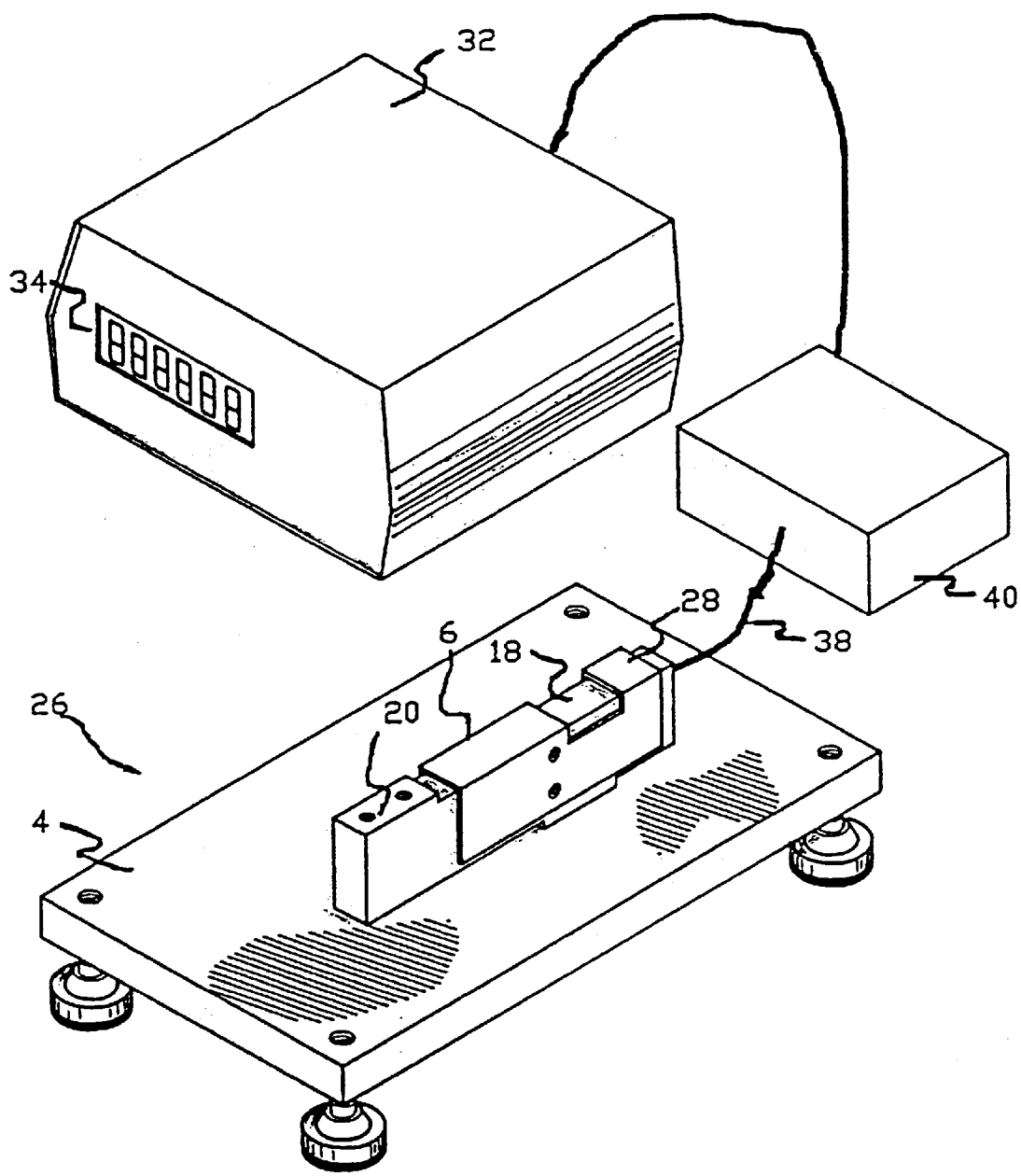
FIG. 3 is a schematic, perspective view of another embodiment of the invention.

Referring now to FIG. 3, there is illustrated a weighing device 26 in which the load cell 6 and inclinometer 28, which is also a load cell, form one integral unit. This simplifies manufacturing and reduces costs. Both the load cell and the inclinometer are fixed to the base 4 by a common anchoring section 18. A common cable 38 including wires from the inclinometer 28 and from the load-bearing section 20 of the load cell extends from the scale to a processor 40. The processor integrates the output from both devices and corrects the weight measured by the load-bearing section for inaccuracies due to any deviation of the load cell from levelness as measured by the inclinometer. The corrected output is then transmitted to the display means 32 where the corrected weight is displayed on a display 34.

The above configuration can of course be used with a display means as illustrated in FIG. 2, and the configuration illustrated in FIG. 2 can be used with the display means of FIG. 3. Furthermore, the inclinometer can be of any of the standard types, and not just of the load cell type.

While the present invention has been described in terms of two preferred embodiments, it is expected that modifications and improvements will occur to those skilled in the art upon consideration of this disclosure.

What is claimed is:

1. A weighing device is for determining an accurate weight of an object, the weighing device comprising:
   (a) a support base;
   (b) a weighing platform for supporting the object;
   (c) a first load cell attached to said support base and deployed to support said weighing platform so as to provide an object weight measurement which is indicative of the weight of an object on said weighing platform;
   (d) a second load cell, attached to one of said support base and said first load cell, said second load cell being deployed so as to provide an inclination correction measurement which is independent of the weight of the object on said weighing platform; and
   (e) a processor electrically connected to said first and second load cells and configured to correct said object weight measurements by an inclination correction factor derived from said inclination correction measurement.

2. The weighing device of claim 1, wherein said second load cell is attached to said support base.

3. The weighing device of claim 1, wherein said first and second load cells are implemented as one integral unit attached to said support base at a common anchoring section.

4. A method for determining an accurate weight of an object, the method comprising:
   (a) measuring the weight of the object; and
   (b) correcting the weight by an inclination correction factor, said inclination correction factor being derived from an output of a load cell deployed so as to be unaffected by the weight of the object.

5. The method of claim 4, wherein said measuring is performed using a second load cell.

6. The method of claim 5, wherein said inclination correction factor is derived by comparing said output with an initial calibration value of said output measured with said load cell ina horizontal position.

7. An inclinometer for measuring small inclinations from an initial orientation, the inclinometer comprising:
   (a) a load cell having a constant loading and being deployed so as to be level in the initial orientation; and
   (b) a processor electrically associated with said load cell and configured for comparing and output of said load cell with an initial calibration value of said output measured with said load cell level.

* * * * *